United States Patent [19]

Jung et al.

[11] 4,350,610
[45] Sep. 21, 1982

[54] HYDROPHOBIC CATALYST FOR RECOMBINERS

[75] Inventors: Margarete Jung; August Winsel, both of Kelkheim, Fed. Rep. of Germany

[73] Assignee: Varta Batterie Aktiengesellschaft, Hanover, Fed. Rep. of Germany

[21] Appl. No.: 252,592

[22] Filed: Apr. 9, 1981

[30] Foreign Application Priority Data

Apr. 10, 1980 [DE] Fed. Rep. of Germany ....... 3013753

[51] Int. Cl.³ .............................................. B01J 31/02
[52] U.S. Cl. ............................... 252/429 R; 252/428; 252/430; 252/429; 252/42
[58] Field of Search .................... 252/428, 430, 429 R; 429/42

[56] References Cited

U.S. PATENT DOCUMENTS 3,400,019  9/1968  LeDuc ................................ 429/42
4,017,663  4/1977  Breault ................................ 429/42

FOREIGN PATENT DOCUMENTS 639568  4/1962  Canada .

*Primary Examiner*—John F. Niebling
*Attorney, Agent, or Firm*—Weiser, Stapler & Spivak

[57] ABSTRACT

A palladium-containing catalyst mat is made of a rolled PTFE-Kieselgur mixture which has been soaked with $PdCl_2$ solution. It is made hydrophobic after soaking by treatment with a PTFE-Emulsion. Finally, it is subjected at about 430° C. to a process which is similar to sintering and in which very finely divided Pd is produced through heat decomposition of the $PdCl_2$. The catalyst mat is preferably combined with a carbon mat impregnated with CuO which, for example, may be a carbon felt which has been made denser through roller compression.

14 Claims, 2 Drawing Figures

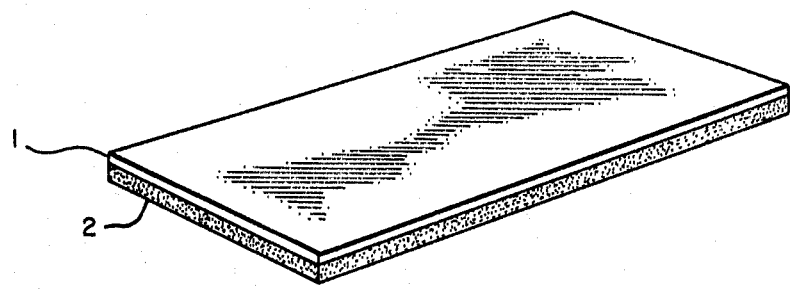
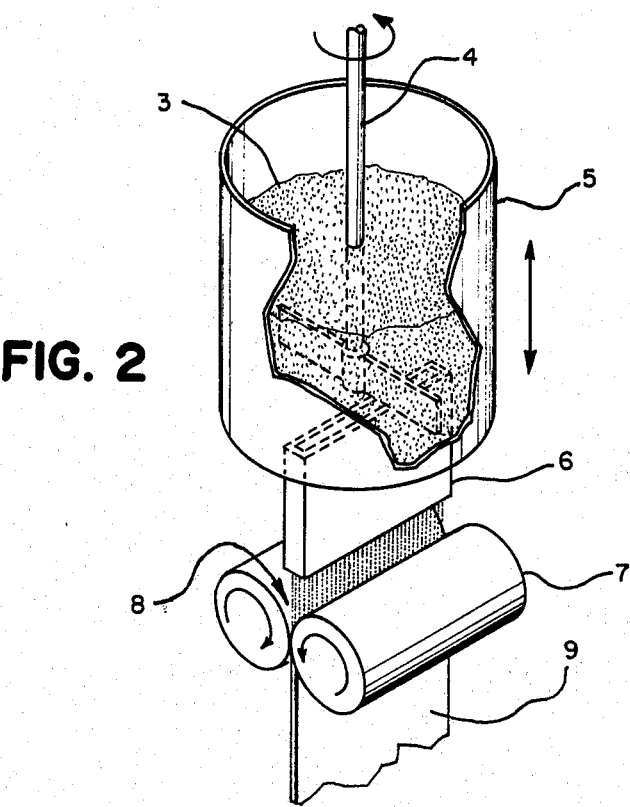

HYDROPHOBIC CATALYST FOR RECOMBINERS

The invention relates to a catalyst for recombining hydrogen and oxygen, and particularly for recombining of gases which evolve during the operation of electric storage batteries. It consists of a mixture of polytetrafluoroethylene and Kieselgur as the catalyst carrier material which is provided with an active catalytic material.

The maintenance-free operation of modern storage batteries is made possible in essence by efficient recombiners for the hydrogen and oxygen gases which evolve during charging, as well as during rest periods and during discharge. Ordinarily the recombiners are positioned on the lid of the battery housing above a vent opening, or else it may be appropriate to integrate them directly into the vent plug.

For trouble-free functioning of the recombiner, not only the choice of a suitable active catalytic material is important—for which palladium has been found generally suitable—but there must also be assured an activity for this material which persists over a long period of time. For that reason, the quality of the catalyst carrier also has decisive importance. It should provide the largest possible surface for the gas, i.e., be highly porous, and on the other hand, resist wetting by the condensing liquid. A further obvious requirement for the catalyst carrier is insensitivity to chemical corrosion.

Conventional catalyst carriers take the form, for example, of a mat of carbon or asbestos fabric impregnated with palladium. However, the effectiveness of such mats diminishes after some period of time, due to insufficient water repellency. Experience with catalyst carriers based on active carbon has further shown that they began to glow after a short period of contact with oxyhydrogen gas and this led to explosion.

For catalyst carriers of mineral origin there is no such danger, but instead the undesired wettability is high. As is disclosed in British Pat. No. 1,277,625, it has therefore been attempted to render hydrophobic a wettable carrier material, such as diatomic earth, by cutting it with polytetrafluoroethylene powder, hereafter called PTFE. The durability of such hydrophobic property must however be questionable whenever the catalyst is subjected to activation in conventional manner before use. This causes a reduction of the soaked palladium salt to palladium by means of formaldehyde in a liquid, usually strongly alkaline medium. Alkali etches silica materials and thereby promotes the wettability, particularly since the porous carrier has to be thoroughly washed out after the reducing treatment.

It has further proven to be difficult to obtain a satisfactory quantity yield, when producing catalyst mats based upon a mixture of PTFE and Kieselgur by means of available presses, which simultaneously satisfies the requirements of the pressed bodies in regard to porosity and strength.

Accordingly, it is an object of the present invention to provide a catalyst, as well as a method of its manufacture, which largely overcomes the above mentioned shortcomings of the product.

This and other objects which will appear are achieved in accordance with the invention by using a mat made of a rolled polytetrafluoroethylene-Kieselgur mixture, which is provided with a catalytically active metal after rolling, and is then made hydrophobic and sintered.

For further details, reference is made to the discussion which follows in light of the accompanying drawings wherein FIG. 1 shows an embodiment of the present invention.

FIG. 2 shows a portion of the equipment used to practice the invention.

A catalyst according to the invention consists of a flexible foil made of a thickened PTFE-Kieselgur mixture, in which the quantity relationship between the two components can vary between 40:60 percent by weight and 60:40 percent by weight. Because of the fraction of the inexpensive Kieselgur within the actual catalyst carrier, this mat is very economical. The content of active catalytic material amounts to about 0.1 to 5 percent by weight, preferably 0.5 to 2 percent by weight of Pd.

In accordance with the invention there can be additionally rolled onto the catalyst mat a carbon mat which is impregnated with copper oxide (CuO). This serves to absorb the antimonyhydrogen ($SbH_3$) contained in the lead storage battery gases, thereby protecting the catalyst from poisoning. The carbon mat simultaneously acts as a diffusion barrier during overload of the recombiner plug by too high a gas supply, during which the recombination rate can fall well below 80%.

A decisive influence upon the suitably of the catalyst mat and its advantageous utility is exerted by the method of manufacture embodying the invention, which is described in what follows.

Forty to sixty percent of PTFE powder, whose average grain size can vary within wide limits in the region of 10 microns to 100 microns, is subjected to an intensive mixing process together with 60 to 40 percent by weight of Kieselgur. In so doing the components are fragmented by the influence of strong mechanical impact forces. Subsequently, the mixture is subjected to vibration and then rolled. The vibratory treatment counteracts the tendency of the mixture to clump and thereby provides good rollability. This can take place, for example, by means of a vibrating table. It is also possible to allow the mixture to run into the roller system through a vibratory trough. The rolled tape obtained is then drawn through a 1 to 10 percent palladium chloride solution, with a dwell time of at least one minute, and is then dried with hot air.

The next step essential to the invention consists of rendering the rolled tape surface hydrophobic using an about-30 percent PTFE suspension, through dipping or spraying. The application time should be less than ten seconds. This short time prevents the PTFE suspension from penetrating too far into the interior of the catalyst carrier and from forming too thick a layer on its surface, which creates the risk of cracking during drying and thereby becoming ineffective.

The correct PTFE dosage may also be achieved by selecting an appropriate dispersion concentration.

The lightly dried and no longer adhesive rolled tape can then be dried through hot air or by means of infrared heating. Thereafter the rolled tape has a smooth, closed, milky white PTFE layer.

The final step in the production of the catalyst mat is the activation, which takes place in accordance with the invention by a process which is similar to sintering. In this process, there is formed in accordance with the expression

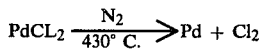

metallic palladium in very finely divided form from the palladium chloride. The fine division of the palladium chloride upon the large surface of the Kieselgur may well represent a favorable side effect of this decomposition process.

Activation takes place in a tubular oven at a temperature between 370° and 460° C., the dwell time ranging from five to thirty minutes depending upon the temperature setting. Through the decomposition of the $PdCl_2$ the surface PTFE layer which creates the hydrophobicity becomes cracked.

A reducing oven atmosphere is not necessary for the activation of the catalyst mat or the rolled tape. The decomposition reaction stated above also takes place in air but preferably in flowing nitrogen. The nitrogen must be so adjusted that the gaseous decomposition products, such as $Cl_2$, $C_2F_4$, or decomposition products of wetting agents, which are entrained during the hydrophobic treatment from the PTFE dispersion, can be removed.

The finished sintered and activated rolled tape can then, if desired, be rolled together with a tape-like carbon mat and immediately cut into individual catalyst mats of any desired shape.

FIG. 1 shows an assembly embodying the invention, between a catalyst mat 1 and a carbon mat 2 impregnated with CuO. The carbon mat may, for example, be a carbon felt which has been thickened by the rolling-together.

The catalyst mat made according to the invention has good mechanical strength and, in addition to having good catalytic activity, maintains its hydrophobicity over long periods of time. Its surface should be shiny black and should preferably exhibit no visible cracks. The catalyst mat embodying the invention has many uses in storage batteries other than for recombining. In particular it can be used in any installations, in which hydrogen is created parasitically, for example, in fuel cell installations for the burning of hydrogen which is exhausted together with the inert gases, in battery chambers of submarines, for example, or electronic data processing installations. It can also be utilized for the removal of radioactive gases in nuclear power plants, or for the production of heat from hydrogen, oxygen and air.

Finally, hydrogen which evolves from hydrogenation and reduction processes can be oxidized with the aid of the catalyst mat, thereby counteracting possible explosion danger due to gas accumulations. The reaction heat can be used for pre-heating in the above mentioned processes.

In addition to palladium, platinum and silver are also suitable catalysts. The latter should be used only in conjunction with platinum or palladium. For example, there may be performed sequential impregnation of the rolled tape, first with a $PdCl_2$ solution, and then with an $AgNO_3$ solution. Finally, mixed catalysts are formed by thermal decomposition. In these the Ag proportion should be substantially smaller than the platinum/palladium metal proportion.

The carbon mat which is produced by rolling of active carbon powder in mixture with some PTFE, has the consistency and appearance of the mat-like carbon electrodes which are known from zinc/air elements.

In contrast, the carbon felt is a carbon fiber material. For further details concerning this material, reference is made to Volume 14, pp. 618–619 of "Ullmanns Encyklopädie der technischen Chemie" (English translation: Ullmanns Encyclopedia of Techanical Chemistry).

To produce the mixture of PTFE and Kieselgur there may be used a conventional impact mill having rapidly rotating cutters of the type used in coffee grinders.

Referring to FIG. 2, this shows the mixture 3 which has been delivered from such an impact grinder (not shown) into a storage container 5 provided with a stirrer 4. The storage container 5 is caused to vibrate in the direction of the vertical arrow. The mixture leaves the storage container 5 through a slot-like outlet 6 and from there is delivered directly into the nip of roller pair 7. The length of the slot-like outlet is so related to the width of the roller nip 8 that a rolled tape 9 of uniform width is produced. The vibration of the storage container causes uniform re-supply of the powder mixture.

We claim:

1. A catalyst for recombining hydrogen and oxygen, particularly gases evolving during operation of electric storage batteries, comprising
    a mixture of polytetrafluoroethylene and Kieselgur as the catalyst carrier material, provided with an active catalytic material, the polytetrafluoroethylene-Kieselgur mixture being formed into a rolled mat, the mat being provided after rolling with a catalytically active material, then made hydrophobic, and sintered.
2. The catalyst of claim 1 wherein
    the mixture proportions of polytetrafluoroethylene and Kieselgur are between 40:60 percent and 60:40 percent by weight.
3. The catalyst of claim 1, which contains between about 0.1 and 5 percent, and preferably between 0.5 and 2 percent of Pd.
4. The catalyst of claim 1 which is rolled onto a carbom mat.
5. The catalyst of claim 4 wherein
    the carbon mat is impregnated with copper oxide.
6. A method of manufacturing a catalyst according to claim 1 wherein
    the polytetrafluoroethylene-Kieselgur mixture is rolled,
    the rolled product is soaked with a palladium chloride solution and immersed in an aqueous polytetrafluoroethylene dispersion after intermediate drying, and
    after renewed intermediate drying, the mat is subjected to sintering in a neutral or reducing oven atmosphere.
7. The method of claim 6 which further comprises subjecting the mixture to rolling after subjecting it to vibration in order to obtain uniform distribution.
8. The method of claim 6 wherein
    the rolled product is soaked for at least one minute in a 0.1 to 5 percent $PdCl_2$ solution.
9. The method of claim 6 wherein
    the rolled product is treated for less than ten seconds through immersion in, or spraying with an aqueous polytetralfuoroethylene dispersion.
10. The method of claim 6 wherein
    the sinter temperature is between 370° and 460° C., and the oven atmosphere is preferably of nitrogen.

11. The catalyst of claim 1 wherein the mixture is produced through intensive mixing during which the mixture components are fragmented by strong mechanical impact forces.

12. The catalyst of claim 11 wherein the intensive mixing is performed by an impact mill having rapidly rotating cutters.

13. The catalyst of claim 1 wherein the portion which is made hydrophobic is a surface layer.

14. The catalyst of claim 13 wherein the hydrophobic surface layer becomes cracked by the sintering.

* * * * *